Figure 1:
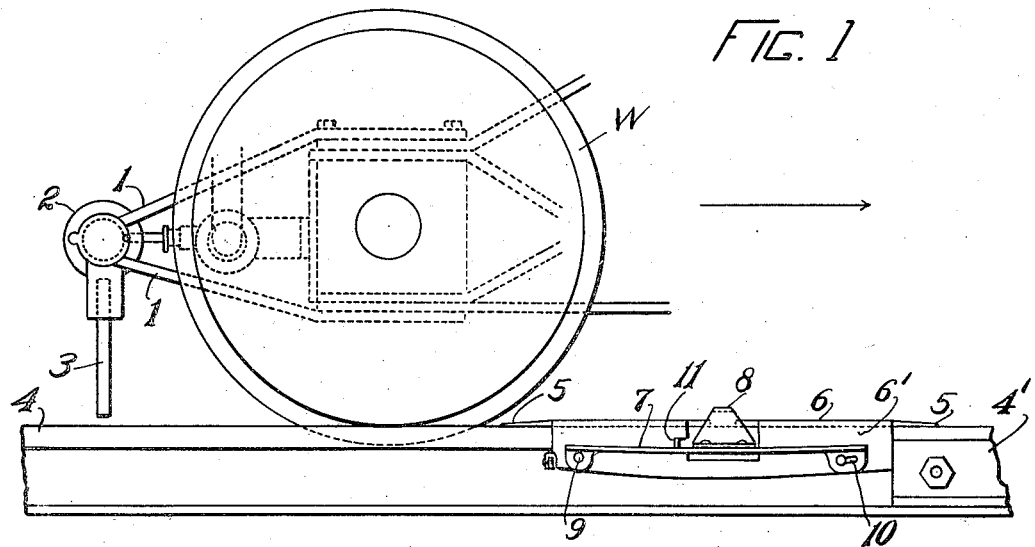

H. R. NEVENS.
AUTOMATIC BRAKE SETTING DEVICE.
APPLICATION FILED APR. 12, 1912.

1,174,020.

Patented Feb. 29, 1916.

WITNESSES
Victoria London
R. B. Ellins.

INVENTOR
HERBERT R. NEVENS
BY
ATTY.

UNITED STATES PATENT OFFICE.

HERBERT RUSSELL NEVENS, OF EAST HARTFORD, CONNECTICUT, ASSIGNOR TO NEVENS-WALLACE TRAIN CONTROL COMPANY, A CORPORATION OF MASSACHUSETTS.

AUTOMATIC BRAKE-SETTING DEVICE.

1,174,020.  Specification of Letters Patent. Patented Feb. 29, 1916.

Application filed April 12, 1912. Serial No. 690,447.

*To all whom it may concern:*

Be it known that I, HERBERT R. NEVENS, a citizen of the United States, residing at East Hartford, county of Hartford, State of Connecticut, have invented certain new and useful Improvements in Automatic Brake-Setting Devices, of which the following is a specification.

This invention relates to train stops, and particularly to devices for setting the brakes of a train through the medium of a portable track plate.

In my original application, Serial No. 634,010, filed June 19, 1911, I set forth, together with the features of the track plate, certain novel tripping and brake setting features which are to be claimed therein.

My present application, therefore, relates more particularly to the portable track plate device by which a train may be stopped at any desired point with absolute certainty and wholly independent of the attention or inattention of the engineer in the cab.

My present invention involves more particularly the problem of actuating a tripper located behind a wheel.

The construction and operation of my device will be more fully set forth in the specification which follows.

In the drawings I have shown as an illustrative embodiment a form of device which I find well adapted to practical means.

Figures 2, 3:
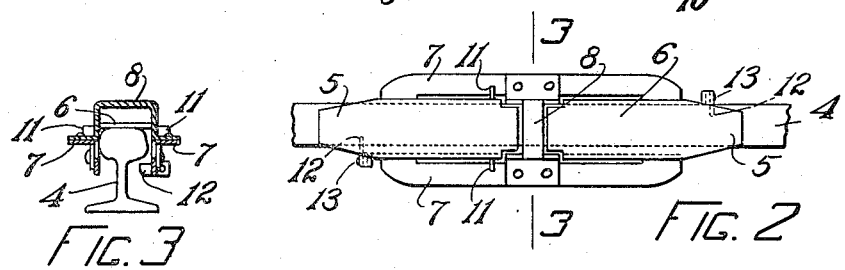
Figure 4:
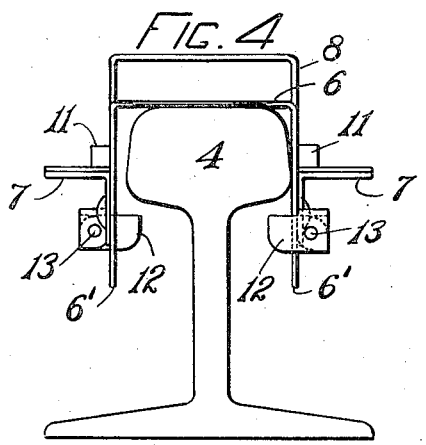
Figure 5:
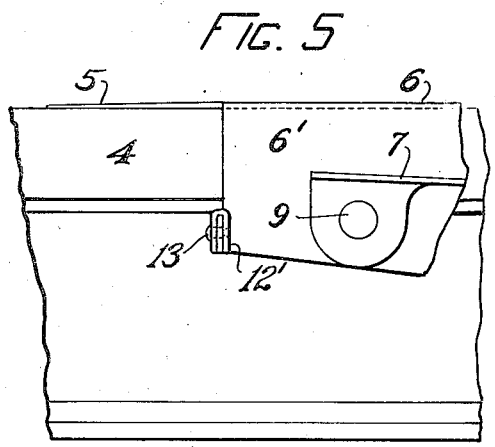
Figure 6:
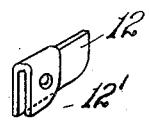

Throughout specification and drawings like reference numerals are employed to indicate corresponding parts and in the drawings:—Figure 1 is a view showing a wheel with a tripping device set behind it, a rail and a track plate on the rail in advance of the wheel, Fig. 2 is a plan view of the track plate and a fragment of the rail, Fig. 3 is a section on the line 3—3, Fig. 2, Fig. 4 is an enlarged view of my track plate set on a rail, Fig. 5 is a fragmentary detail showing one end of the track plate, and Fig. 6 is a view of the flange engaging dog of my track plate removed.

As described in my prior application, my tripping device is mounted on brackets 1 bolted to the frame of a pony truck, or any other convenient truck on a locomotive tender or car. On the brackets 1 are bearings in which the air brake valve actuating mechanism 2 is journaled. To this a tripping arm 3 is connected which hangs directly behind the wheel W and over the rail 4.

My portable track plate consists of a central portion 6 adapted to lie on the tread of the rail and terminating in tapering ends 5, 5. Depending from the plate 6 are marginal flanges $6^1$ which hang down below the tread of the rail. On these flanges $6^1$ are set studs 9 and 10. A leaf spring 7 spans these studs, being pivotally connected at 9 and pivotally and slidably connected at 10 through a slot. The plate 6 and the flanges $6^1$ are cut away at the center of the plate to form an opening or gap. A small lip 11 is turned up at one side of this opening to act as a stop for the spring 7 so that it will bear against it somewhat under pressure to hold the parts steady. Within this opening of the plate a bridge-piece 8 is set which spans the rail and rests with its ends on the two springs 7 which normally hold the cross piece of the bridge slightly above the rail so that it will contact with the tripper 3. At one end of the flanges $6^1$ an ear is struck up to which is pivoted a latch piece 12 having a fold $12^1$ surrounding the ear, to which it is attached by a pivot 13. In placing the plate 6 upon the rail the latches 12 will be drawn up, but as soon as the flanges of the rail are passed they will drop down, as shown in Fig. 4, thus locking the plate on the rail so that it can not be thrown or tripped off when struck by the wheel W.

The track plate 6 in operation is carried back by the flagman whenever a train is brought to a standstill. If an oncoming engineer fails to signal his recognition of the flagman's warning, the plate 6 is slipped on the track, preferably adjacent to a rail joint. In running over this plate the wheel W bears down on the bridge 8, but as soon as the wheel has passed the bridge the plate 8 is drawn up again in time to catch the tripper 3 and set the brakes.

While I have discussed and claimed my invention in the terms of its application to the present railway system, it will be understood that it may be applied to any system of this nature and that the terms employed should be so construed.

Various modifications in the construction and operation of my device may obviously be made, all without departing from the spirit of my invention if within the limits of the appended claims.

What I, therefore, claim and desire to secure by Letters Patent is:—

1. A track obstacle for actuating a train carried trip located behind a wheel and over a rail comprising a portable track plate adapted to be applied to the rail tread, and a movable tripper resiliently supported on said plate across said tread and depressible under a wheel to return in time to actuate the train carried trip located behind said wheel.

2. A device for automatically setting air brakes for railroad trains comprising a rail plate adapted to be applied to the rail tread, depending lateral flanges thereon, resilient members on said lateral flanges and a yielding tripping member supported on said resilient members.

3. A track obstacle for actuating a train carried trip located behind a wheel and over a rail comprising a rail plate adapted to be applied to the rail tread, means for detachably connecting said plate in place, and resilient tripping means on said plate normally disposed above the rail tread and depressible under a wheel to return in time to actuate the train carried trip located behind said wheel.

4. A device for automatically setting air brakes for railroad trains comprising a rail plate adapted to be applied to the rail tread, said plate being centrally opened, a resilient supporting member on each side of said plate and a tripper extending across said opening and supported by said resilient members.

5. A portable device for automatically setting air brakes for railroad trains comprising a rail plate adapted to be applied to the rail tread, lateral depending flanges thereon, rail engaging dogs on said flanges and yielding tripping means on said plate.

6. A portable device for automatically setting air brakes for railroad trains comprising a rail plate adapted to be applied to the rail tread, and having an opening therein and a tripper yieldingly supported above said plate and depressible within said opening by a wheel in passing but releasable immediately upon the passage of the wheel.

7. A track obstacle for actuating a train carried trip located behind a wheel comprising a portable track plate adapted to be applied to a rail tread, a movable tripper on said plate depressible under a wheel and a yieldable support for said tripper normally effective to hold it above said tread and effective upon depression of the tripper to return said tripper in time to actuate the train carried trip located behind said wheel.

8. A device for automatically setting air brakes for rail road trains comprising a rail plate adapted to be applied to a rail tread, means for positively locking said plate to said rail, tripping means on said plate depressible under a wheel and a resilient support normally effective to hold said tripping means in tripping position and effective upon depression of said tripping means to return said means in time to actuate the train carried trip located behind said wheel.

9. A track obstacle for actuating a train carried trip located behind a wheel comprising a track plate adapted to engage the tread of a rail, a tripper on said plate depressible under a wheel, and a resilient support for said tripper pivotally connected to said track plate near one end and having a pivotal and sliding engagement with said plate at its other end, said support normally effective to hold said tripper in tripping position and effective upon depression of said tripper to return it in time to actuate the train carried trip located behind said wheel.

10. A track obstacle for actuating a train carried trip located behind a wheel comprising a track plate adapted to engage the tread of a rail, a tripper bridging said tread and a resilient support for said tripper carried by said plate, said support permitting said bridge to be depressed by a wheel and effective to return said bridge to trip actuating position as soon as the wheel passes.

11. A track obstacle for actuating a train carried trip located behind a wheel comprising a track plate adapted to movably engage the tread of a rail and carrying a tripper yieldable upon actuation by the wheel of a train proceeding in either direction of travel, said tripper being returned after depression thereof by a wheel in time to actuate the train carried trip located behind said wheel.

12. A portable track obstacle for actuating a train carried trip comprising a rail engaging member, a trip actuating member supported upon said rail engaging member and depressible by a train wheel in passing but returnable immediately upon the passage of said wheel to actuate the train carried trip, and means for effecting said return.

In testimony whereof I affix my signature in presence of two witnesses.

HERBERT RUSSELL NEVENS.

Witnesses:
 JOSEPH BARR,
 PERCY W. LYONS.